Oct. 9, 1934.  W. G. WILSON  1,975,815
LOCK NUT
Filed Dec. 22, 1932
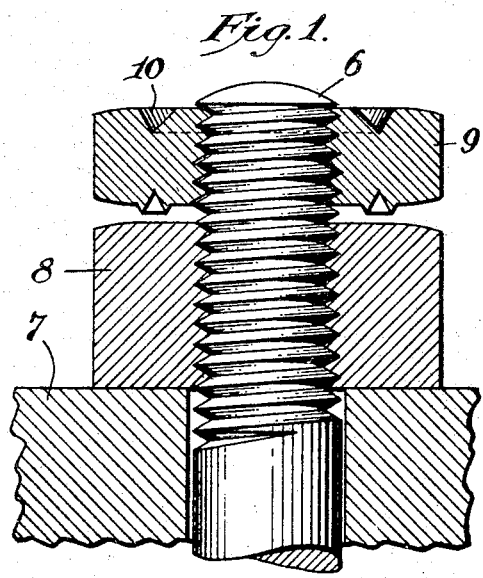
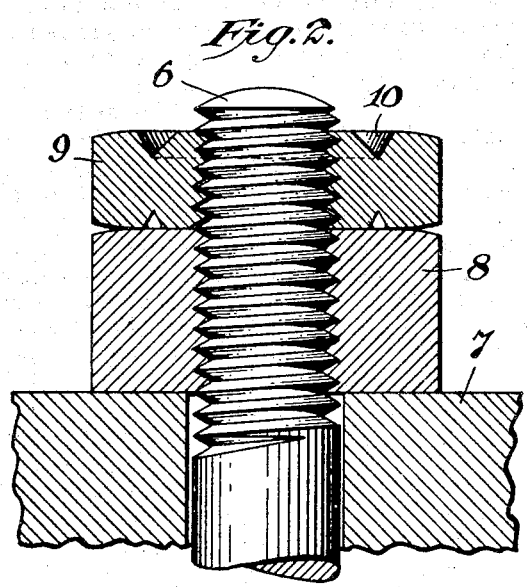
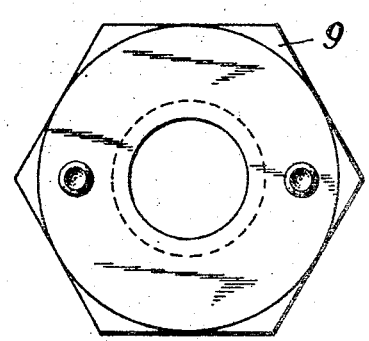
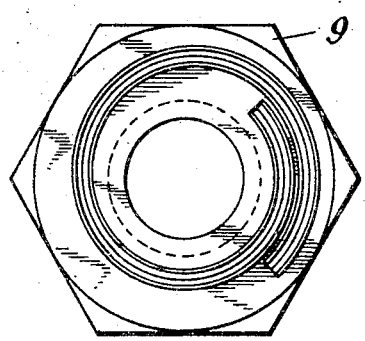
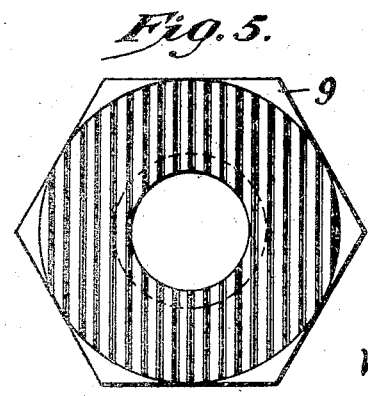
INVENTOR
Wylie G. Wilson
BY
Ramsey & Kent
ATTORNEYS Patented Oct. 9, 1934

1,975,815

UNITED STATES PATENT OFFICE 1,975,815

LOCK NUT

Wylie G. Wilson, Elizabeth, N. J., assignor to Wilson Locknut Company, Jersey City, N. J., a corporation of Delaware Application December 22, 1932, Serial No. 648,370

3 Claims. (Cl. 151—21)

This invention relates to lock-nuts, particularly of the type in which, by deformation of a part of the nut thread the nut will take a grip on an appropriate bolt sufficient to substantially insure against other than deliberate removal. Lock-nuts of this general character have been devised in which the deformation of the nut thread is such that the application of the nut to an appropriate bolt does not destroy or seriously injure the bolt thread; as a consequence the nut may be screwed on and off repeatedly with no serious injury to the bolt but with gradually weakening grip of nut on bolt. There are situations where such a lock-nut should be used only once, and it is important that the lock-nut be provided with a tell-tale, so that the mechanic may readily identify a new nut that has not been used, and just as readily know whether the nut has been once screwed home on the bolt against another nut or a flange or the like and afterwards removed from the bolt.

In the drawing I have shown in Fig. 1 a view partly in section and partly in elevation, illustrating a bolt and cooperating parts, including a lock-nut equipped in accordance with my invention, screwed part way down above a holding nut 8 on a bolt inserted in an element 7.

Fig. 2 is similar to Fig. 1, but shows the lock-nut screwed home, with consequent effect on the tell-tale; and Figs. 3, 4 and 5 are plan views of the work face of a lock-nut such as shown in Figs. 1 and 2, having, respectively, different forms of tell-tale thereon.

By work face I mean the face which presses against the nut 8 or the flange or plate 7 to do the work for which the nut is used, i. e. holding parts together as when on flange 7, or holding another part in a specific place as when on nut 8.

Referring to the numerals on the drawing, the numeral 6 indicates a bolt, which may be associated with a plate or other element 7 as shown, and 8 is an ordinary nut screwed down on the bolt and engaging the surface of element 7 which may be a flange or the like. A lock-nut is shown at 9. This may be an ordinary nut, generally appropriate to the bolt, but having in an end face (the outer face in Fig. 1) an indentation 10 adjacent the nut aperture. The conformation and dimensions of this indentation and its distance from the nut aperture may be chosen so that as the indentation is pressed into the face of the nut adjacent the nut aperture, certain upper threads of the nut are deformed and biased out of normal continuity-relation with the remaining threads, but resiliently yieldable, against the bias, towards such continuity-relation.

As a result of thread deformation produced by the indentation 10, I have a nut which will receive the bolt freely into the lower end of its threaded aperture, but which will grip the bolt threads that are in the zone of the deformed threads, with the result that such a nut screwed on to a bolt as in Fig. 2 will resist reverse rotation, more or less strongly of course according to the kind and extent of thread deformation that has been accomplished in the nut.

On the lower or work face of the lock-nut 9 (the face which in the drawing is to make contact with the underlying ordinary nut 8 or other structure, obviously the lower nut 8 may be dispensed with and lock-nut 9 may contact directly with element 7) I provide tell-tale means, so that when lock-nut 9 is screwed on to the limit of its movement (as in Fig. 2) the characteristics of the tell-tale will be definitely and unmistakably changed.

In Fig. 3 (also Fig. 1) the tell-tale is a relatively thin and easily deformable outwardly projecting circular burr, surrounding a shallow pit; such pit and burr may be produced by driving into the nut face a centre punch or like tool, as will be readily understood. I prefer to use two of these tell-tales which may be diametrically opposed, as in Figs. 1, 2 and 3. Fig. 1 shows the tell-tale as it is before the lock-nut is screwed down tightly against the relatively stationary underlying element 8, and Fig. 2 shows it screwed down against element 8. In arriving at the close contact shown in Fig. 2, between the work face of the lock-nut and the opposed face of element 8, the burrs of the tell-tale or tell-tales have been flattened or bent or changed in form, so that they no longer project as before beyond the work face of the lock-nut. Therefore, if the lock-nut once so used, is taken off its bolt and thus made available for re-use, the fact of its previous use (i. e., that the locking bias of the deformed threads has been weakened by at least one application of the nut to a bolt) will be apparent to the mechanic who applies the test of vision or touch.

In Fig. 4 the readily deformable tell-tale is produced by a cast-up burr in spiral form. And in Fig. 5 I have a number of parallel indentations, with corresponding deformable line burrs cast up.

It will be noted that in the forms of tell-tale shown in the drawing the structure consists of a projection on the edge of a depression. The result of this is that in nuts made of such customary and more or less ductile materials as steel, brass, or the like, the projecting tell-tale may bend or flow or be displaced into the depression when pressed between the nut and an opposed face, thus permitting contact over the general area of the end face by the readily produced depression of the projection to the general plane of that face.

Preferably the indentation of the outer end face of the nut, that is, the operation which converts an ordinary nut into a lock, is done simultaneously with the operation that produces the tell-tale in the other or work face of the nut. And of course the indentations that produce the tell-tale burrs must not be so considerable as to cause thread deformation.

I claim:

1. A lock-nut having part of its thread structure adjacent the inner or work face of the nut adapted for normal engagement with the threads of an appropriate bolt, and another part of its thread structure adjacent the other face of the nut initially distorted and biased out of normal continuity-relation with the first-named part of the thread structure, but resiliently yieldable towards such normal continuity-relation, the bolt when entered into operative relation with the distorted thread structure tending to force it against its bias into normal continuity-relation with the first-named thread portion whereby the bolt threads are frictionally gripped and relative rotation between nut and bolt is resisted, the work face of the nut having tell-tale means projecting therefrom readily deformable on rotative contact with a resisting surface as the nut is screwed home on the bolt against such surface, whereby the tell-tale may indicate that the gripping part of the thread structure has been subjected to the condition-changing effect of engagement with the bolt threads.

2. The structure set forth in claim 1 in which tell-tale means occupy several separate areas on the work face.

3. The structure set forth in claim 1 in which tell-tale means occupy diametrically opposite areas on the work face.

WYLIE G. WILSON.